United States Patent
Welsch et al.

[11] Patent Number: 6,029,511
[45] Date of Patent: Feb. 29, 2000

[54] METHOD AND APPARATUS FOR IMPROVING VEHICLE DRIVING STABILITY DURING DECELERATION

[75] Inventors: Klaus Welsch, Eching-Guenzenhausen; Klaus Schmidt, Paunzhausen, both of Germany

[73] Assignee: Bayerische Motoren Werke Aktiengesellschaft, Germany

[21] Appl. No.: 08/923,434

[22] Filed: Sep. 4, 1997

[51] Int. Cl.[7] .................................................. G01M 15/00
[52] U.S. Cl. ...................... 73/118.1; 180/338; 340/441; 701/67; 701/69; 701/70
[58] Field of Search .................................. 73/118.1, 116; 180/338, 337; 340/441, 438; 701/67, 68, 69, 70, 87

[56] References Cited

U.S. PATENT DOCUMENTS

| | | | |
|---|---|---|---|
| 4,671,373 | 6/1987 | Sigl | 180/197 |
| 4,682,667 | 7/1987 | Hosaka | 180/197 |
| 4,796,718 | 1/1989 | Thielen et al. | 180/197 |
| 4,890,685 | 1/1990 | Naito | 701/69 |
| 5,060,747 | 10/1991 | Eto | 701/69 |
| 5,346,032 | 9/1994 | Sasaki | 701/69 |
| 5,448,478 | 9/1995 | Eto | 701/87 |
| 5,839,084 | 11/1998 | Takasaki et al. | 701/67 |

FOREIGN PATENT DOCUMENTS

| | | |
|---|---|---|
| 34 27 725 A1 | 8/1985 | Germany . |
| 35 28 389 A1 | 2/1987 | Germany . |
| 43 16 421 A1 | 11/1994 | Germany . |

*Primary Examiner*—Eric S. McCall
*Attorney, Agent, or Firm*—Evenson, McKeown, Edwards & Lenahan, P.L.L.C.

[57] ABSTRACT

The invention provides a method for detecting the wheel rpm values of the nondriven and the driven wheels and for comparing them with one another in order to improve vehicle stability, for example when the driving torque of the engine is too high. A friction clutch located between the drive motor and the wheels in the drive train is disengaged when the rpm of the driven wheels is less than the rpm of the nondriven wheels and the difference between the two wheel rpm values exceeds a given limiting value. The friction clutch is re-engaged when the difference between the two wheel rpm values reaches or falls below a second limiting value.

11 Claims, 2 Drawing Sheets

METHOD AND APPARATUS FOR IMPROVING VEHICLE DRIVING STABILITY DURING DECELERATION

BACKGROUND AND SUMMARY OF THE INVENTION

This application claims the priority of German Application No. 196 35 809.4, filed Sep. 4, 1996, the disclosure of which is expressly incorporated by reference herein.

The invention relates to a method and apparatus for improving driving stability of a vehicle during deceleration by detecting wheel speeds of driven and nondriven wheels.

German patent document DE 35 28 389 A1 discloses a device of this generic type which comprises first and second rpm sensors, with the first rpm sensor generating a first rpm signal that corresponds to the rpm of the driving wheel (or the output rpm of the transmission), and the second rpm sensor generating a second rpm signal that corresponds to the rpm of the towed non-driven wheel. The two wheel rpm signals are compared with one another and if the first rpm signal represents an rpm that is higher by at least a predetermined differential value than the second rpm signal, a friction clutch located between the engine and the transmission is disengaged. If the first and second rpm signals differ by less than the predetermined differential value, the friction clutch is re-engaged.

It is possible with the above device in particular to achieve improved driving stability during acceleration in cases when the force transmitted by the driving motor to the drive wheels is greater than the frictional adhesion between the drive wheels and the road. Above a certain amount of slip, a forced decoupling takes place in the drive train which contributes to safe driving behavior.

However, excessive engine braking during deceleration is also problematic, for example if the driven wheels are braked excessively when the accelerator is released. If the drive wheels are braked to such an extent that the adhesive friction between the wheels and the road is lost, lateral guidance can be lost on curves. The development of such situations in vehicles without clutch pedals can be dangerous, since the driver has no way to manually intervene in a crisis situation. In such a vehicle, therefore, in the problem situation described above, understeer or oversteer, or in extreme cases a skid, would unavoidably occur.

The object of the present invention is to provide an improved method and apparatus of the type recited at the outset, which provide improved driving stability of a vehicle, even during deceleration.

This object is achieved by the method and apparatus according to the invention, in which, when the second (driven) wheel rpm is smaller by a certain amount than the first (non-driven) wheel rpm, a friction clutch in the drive train is disengaged so that the flow of power from the engine to the driven wheels is interrupted. As a result of this decoupling of forces, the wheel rpms of the two axles can become equal to one another once more and the clutch can be re-engaged. In this way, it is possible to increase driving stability in critical situations during deceleration, and reliably to prevent understeer or oversteer. This is especially important when the driver has no means of intervention, for example when there is no clutch pedal.

According to one advantageous embodiment, the friction clutch is re-engaged when the driven and nondriven wheels reach essentially the same rpm; in other words when the difference between them is essentially zero. In this case, there is no longer any slip between the drive wheels and the road so that optimum driving stability is ensured.

The difference between the first and second wheel rpm values that determines when the clutch is disengaged preferably depends upon various conditions. First, the limiting value of the engine rpm can be selected. Second, weighting by various vehicle operating conditions can also be provided such as, for example, transverse acceleration and/or the gear that has been engaged. This has the advantage that the slip of the drive wheels during deceleration is evaluated, taking into account the gear that has been engaged or the transverse acceleration, so that these vehicle operating conditions or other vehicle operating conditions can have a critical influence on vehicle stability.

According to one advantageous embodiment of the invention, the disengagement of the friction clutch can take place quickly. On the other hand, when the friction clutch is re-engaged, caution is advisable. For example if the vehicle is traveling over smooth ice, rapid engagement of the friction clutch would produce immediate repeated lock-up of the corresponding drive wheel. For this reason it is advantageous for the engagement of the friction clutch to be regulated. For example, the first and second wheel rpms could be compared continuously with one another during the entire engagement process and a reaction with respect to further engagement could take place if it could be determined how the drive wheel or wheels behave(s) during the engagement process. If for example the rpm of the corresponding drive wheels immediately decreases again during the engagement process, the friction clutch must not be engaged further or must be disengaged once again.

Preferably, all four wheels of a vehicle are monitored, with the first and second wheel rpm values being compared separately for each side of the vehicle in an especially advantageous embodiment of the invention. This ensures a high degree of safety in evaluating vehicle stability during deceleration, especially when the larger of the two differences is used to evaluate the vehicle state.

The apparatus according to the invention requires rpm sensors that pick up the wheel rpm of the corresponding wheels, as well as a comparator for the corresponding wheel rpm signals and a control device that reacts depending on the results of this comparison as described above.

Other objects, advantages and novel features of the present invention will become apparent from the following detailed description of the invention when considered in conjunction with the accompanying drawings.

DETAILED DESCRIPTION OF THE DRAWINGS

Figure 1:
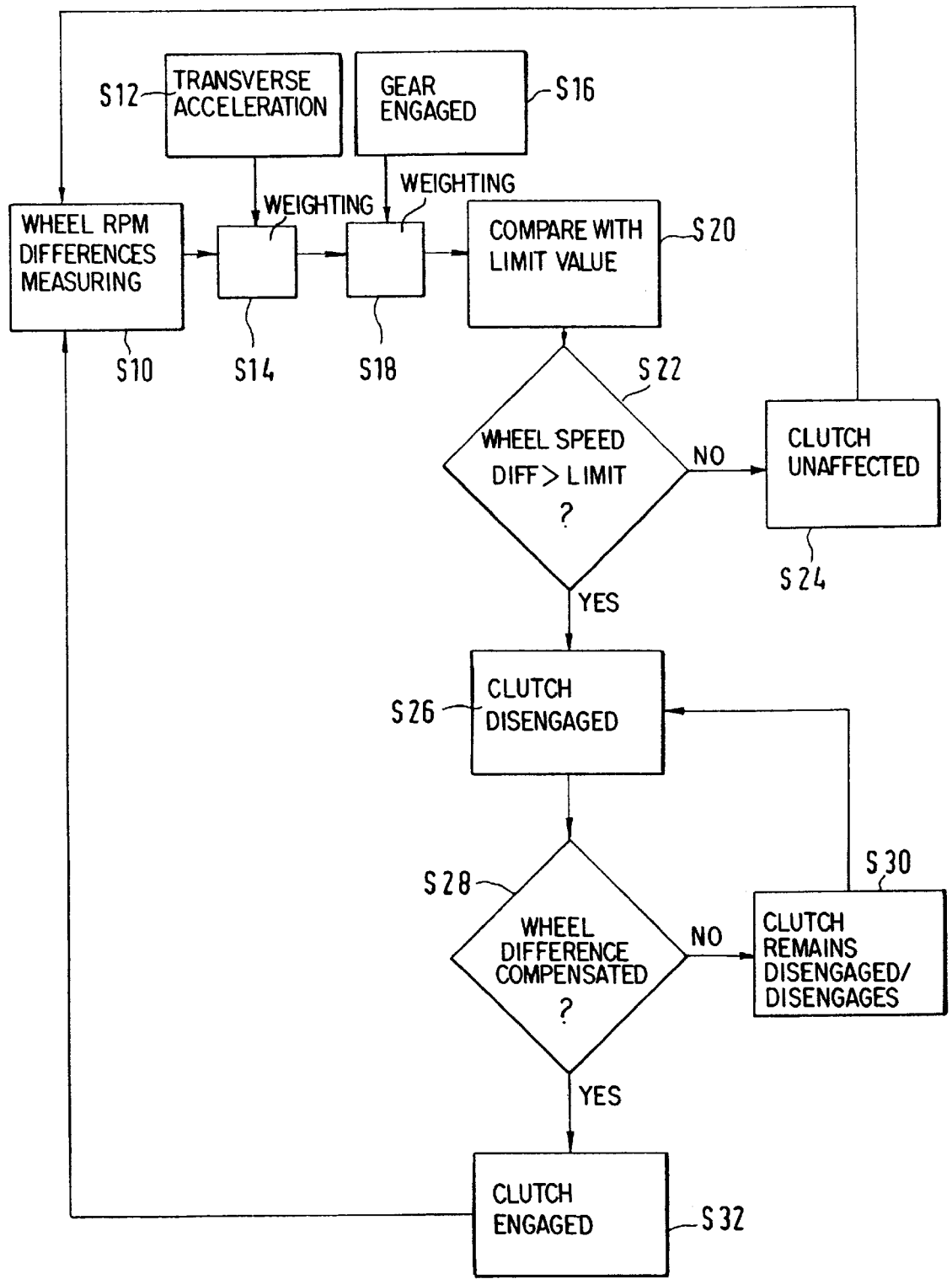
FIG. 1 shows a flowchart illustrating a special embodiment of the method according to the invention.

Referring to FIG. 1, the rpm values of all four wheels are constantly monitored and the difference in wheel rpm between the front and rear axles is generated (S 10). This is done by generating the difference between the wheel on the front axle and the wheel on the rear axle for each side of the vehicle. The larger of the two differences is used to monitor the driving state. This difference is weighted in accordance with the determined transverse acceleration (S 12, S 14) and the gear that is engaged (S 16, S 18) to provide a new value that is suitably adapted depending on the vehicle state or operating conditions (transverse acceleration and engaged gear in this case) and is compared in the next step with a predetermined limiting value (S 20). This limiting value for example can be made to depend on the engine rpm.

If the weighted difference between the wheel rpm values is greater than the limiting value mentioned above (S 22) the clutch is immediately disengaged (S 26). If the difference between wheel rpm values is not greater than the limiting value (S 22) the clutch remains unaffected (S 24) and the process returns to the first step.

If the friction clutch is disengaged (S 26), the wheel rpm values of the driven and nondriven wheels continue to be compared with one another continuously. As long as the wheel rpm differentials have not been eliminated, the friction clutch remains disengaged (S 30). It is then re-engaged when the wheel rpm values are again the same (S 28). In this case, the wheel rpm differential tends toward zero.

When friction clutch (S 32) is engaged, in the present embodiment the wheel rpm values of the driven wheels are monitored continuously during the engagement process. If these wheel rpm values again drop below the value for the nondriven wheels, the engagement process is discontinued or the friction clutch is disengaged once more in accordance with the values determined.

If the clutch is again engaged fully, a switch is made back to the first step.

Figure 2:
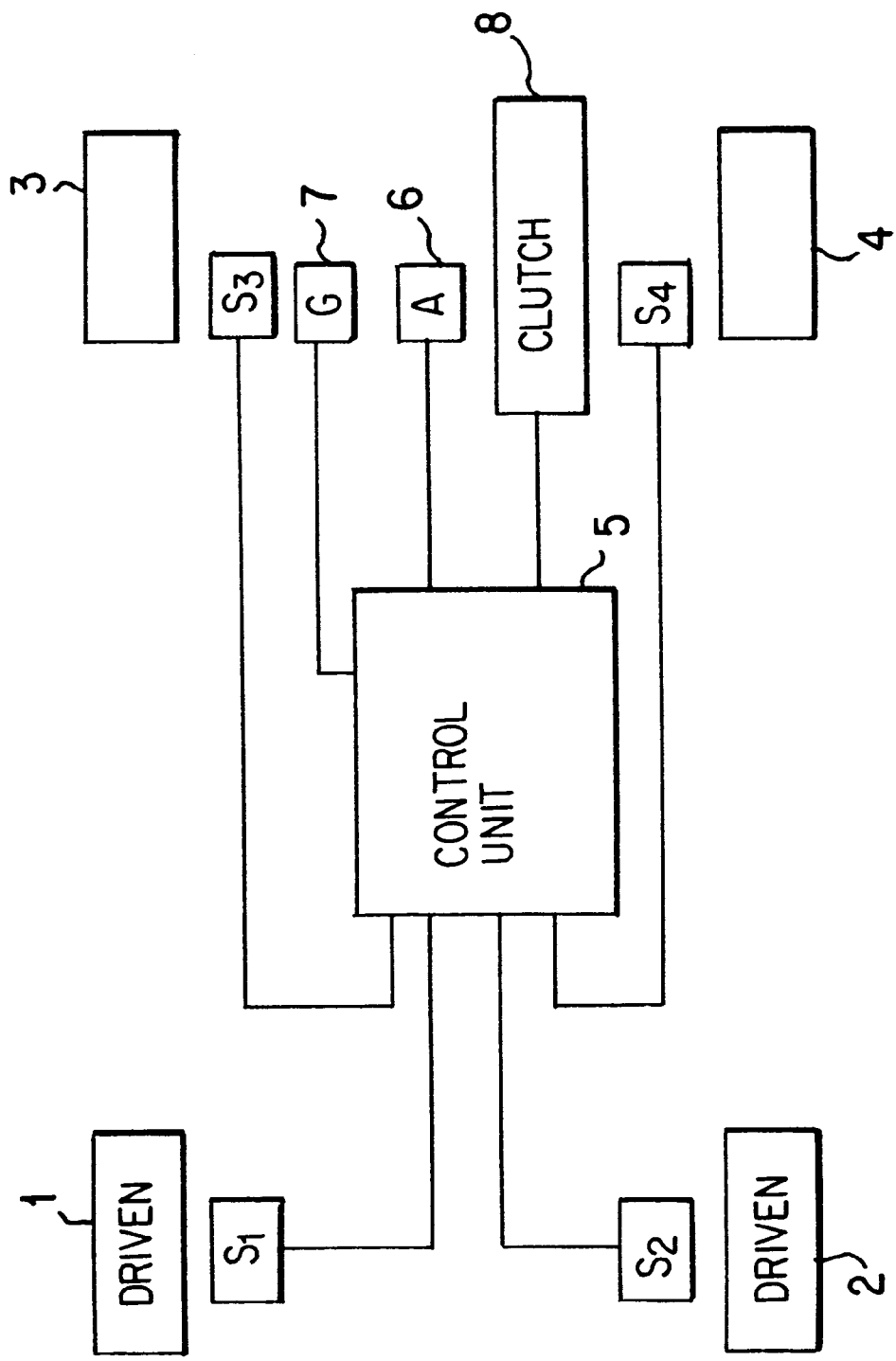
FIG. 2 is a schematic diagram of an embodiment of an apparatus for implementing the control according to FIG. 1.

FIG. 2 is a schematic diagram of an arrangement for implementing the control according to the invention. Speed sensors $S_1$ and $S_2$ are provided adjacent each of the driven wheels 1, 2, while speed sensors $S_3$ and $S_4$ are provided at each of the nondriven wheels 3,4. Information concerning the respective wheel speeds is fed to the control unit 5, which also receives inputs from a sensor 6 for detecting transverse acceleration and a sensor 7 for determining a current gear selection of the vehicle transmission. Based on these inputs, the control unit 5 generates control signals which are transmitted to the clutch 8, causing it to engage or disengage in the manner described previously.

With the above method and apparatus, especially in motor vehicles with automatic clutches, driving safety can be increased. Swerving of the vehicle caused by engaging the wrong gear or by an inappropriate load shift is prevented. The function can be integrated into existing devices or functions (clutch management, ABS, ASC, etc.), so that an increase in overall cost can be essentially avoided.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Method for improving driving stability of a vehicle during deceleration, said vehicle having a drive motor, driven wheels which are driven by the drive motor and nondriven wheels which rotate at a speed which is independent of said drive motor, said method comprising:

detecting a first wheel rpm of at least a nondriven wheel of the vehicle;

detecting a second wheel rpm of at least a driven wheel of the vehicle;

disengaging a friction clutch located between the drive motor of the vehicle and driven wheels of the vehicle when the second wheel rpm is smaller than the first wheel rpm and a difference between the first and second wheel rpm values exceeds a predetermined first limiting value; and re-engaging the friction clutch when the difference between the first and second wheel rpm values reaches or falls below a second limiting value, said second limiting value being lower than the first limiting value.

2. Method according to claim 1, wherein the second limiting value is approximately equal to zero.

3. Method according to claim 1, wherein the first limiting value is chosen as a function of the engine rpm.

4. Method according to claim 1, wherein the first limiting value is weighted as a function of vehicle operating conditions.

5. Method according to claim 4, wherein at least one of transverse acceleration and a gear that is engaged are taken into account as vehicle operating conditions.

6. Method according to claim 1, wherein the friction clutch is rapidly disengaged.

7. Method according to claim 1, wherein the friction clutch is engaged under control.

8. Method according to claim 7, wherein the first and second wheel rpm values are constantly compared with one another during an engagement process, and if a difference between the first and second wheel rpm values increases again during an engagement process, the friction clutch is not engaged any further or is disengaged once more.

9. Method according to claim 1, wherein the wheel rpm values of four wheels of the vehicle are detected.

10. Method according to claim 1, wherein a comparison between the first and second wheel rpm values is performed separately for each side of the vehicle, and a larger of the differences is used.

11. Device for improving driving stability of a vehicle during deceleration, comprising:

a friction clutch operatively coupling a drive motor and driven wheels of the vehicle;

an adjusting device for engaging and disengaging the friction clutch;

at least one first rpm sensor that generates a signal that corresponds to rpm of at least one nondriven wheels of the vehicle;

at least one second rpm sensor that generates a signal that corresponds to rpm of at least one of said driven wheels; and a control device that receives said signals and controls the friction clutch as a function thereof, whereby said friction clutch is disengaged when said rpm of said at least one nondriven wheel exceeds the rpm of the at least one driven wheel by an amount which is greater than a first predetermined value, and is re-engaged when said rpm of at least one nondriven wheel exceeds said rpm of the driven wheel by an amount which is less than a second predetermined value.

* * * * *